US008311724B2

(12) United States Patent
Fujii et al.

(10) Patent No.: US 8,311,724 B2
(45) Date of Patent: Nov. 13, 2012

(54) METHOD OF CONTROLLING ENGINE SYSTEM AND ENGINE SYSTEM

(75) Inventors: Mikihito Fujii, Hiroshima (JP); Kazuya Yokota, Hiroshima (JP); Naoyuki Yamagata, Hiroshima (JP); Kazuaki Narahara, Hiroshima (JP)

(73) Assignee: Mazda Motor Corporation (JP)

( * ) Notice: Subject to any disclaimer, the term of this patent is extended or adjusted under 35 U.S.C. 154(b) by 361 days.

(21) Appl. No.: 12/704,122

(22) Filed: Feb. 11, 2010

(65) Prior Publication Data

US 2010/0217504 A1 Aug. 26, 2010

(30) Foreign Application Priority Data

Feb. 20, 2009 (JP) .................................. 2009-037301
Sep. 29, 2009 (JP) .................................. 2009/225152

(51) Int. Cl.
*F01L 1/34* (2006.01)
*G06F 19/00* (2011.01)
(52) U.S. Cl. ..................................... 701/110; 123/90.15
(58) Field of Classification Search .................. 701/105, 701/110, 102; 123/90.15, 345, 346, 347, 123/348; 60/602
See application file for complete search history.

(56) References Cited

U.S. PATENT DOCUMENTS 5,622,144 A * 4/1997 Nakamura et al. ......... 123/90.15

FOREIGN PATENT DOCUMENTS

| JP | H02-123208 A | 5/1990 |
| JP | H05-086951 A | 4/1993 |
| JP | H09-125994 A | 5/1997 |
| JP | 2001-336446 A | 12/2001 |
| JP | 2004-218522 A | 8/2004 |
| JP | 2005-325813 A | 11/2005 |
| JP | 2007-040275 A | 2/2007 |
| JP | 2007-198135 A | 8/2007 |
| JP | 2007-263083 A | 10/2007 |
| JP | 2008-121499 A | 5/2008 |

OTHER PUBLICATIONS

English translation of the Japanese Office Action "Notice of Reasons for Rejection" with mailing date of Jan. 5, 2011; Japanese Patent Application No. 2009-225152.

* cited by examiner

*Primary Examiner* — Mahmoud Gimie
(74) *Attorney, Agent, or Firm* — Studebaker & Brackett PC; Donald R. Studebaker

(57) ABSTRACT

A valve overlap period is increased as a desired torque of an engine increases by advancing an opening timing of an intake valve at a rate greater than that of retarding a closing timing of an exhaust valve in a low engine-torque area in which the desired torque of the internal combustion engine is relatively low (step S16). The valve overlap period is increased as the desired torque of the engine increases by retarding the closing timing of the exhaust valve at a rate greater than that of advancing the opening timing of the intake valve in a high engine-torque area in which the desired torque of the internal combustion engine is relatively high (step S17). Accordingly, the drivability can be improved by obtaining the proper torque and the smooth torque curve in the wide driving area.

20 Claims, 13 Drawing Sheets

METHOD OF CONTROLLING ENGINE SYSTEM AND ENGINE SYSTEM

BACKGROUND OF THE INVENTION

The present invention relates to a method of controlling an engine system equipped with a turbo charger, which has the function of increasing a valve overlap period during which an intake valve and an exhaust valve are both opened as a desired torque of the engine (i.e., engine load) increases, and the engine system.

It is generally known that when the valve overlap period during which the intake valve and the exhaust valve are both opened is gradually increased from a state shown in FIG. 9A to states shown in FIGS. 9B, 9C and 9D as the desired torque (load) of the engine increases (an area of valve overlap is illustrated with hatching in these figures for convenience) in the engine equipped with the turbo charger, the mount of scavenging gas so increases that the so-called "late burning (combustion)" in which the fresh air and unburned fuel are reacted in an exhaust pipe occurs and the temperature of the exhaust gas flowing to a turbine of the turbo charger increases, so that the rotational speed of the turbine increases and accordingly the rotational speed of a compressor of the turbo charger also increases. Consequently, the intake volume increases so that the engine torque can be increased.

There are three manners of increasing the valve overlap period: only advancing the opening timing of the intake valve; only retarding the closing timing of the exhaust valve; and both advancing the opening timing of the intake valve and retarding the closing timing of the exhaust valve. Herein, advancing the opening timing of the intake valve in a low engine-speed area is advantageous in increasing the intake volume. This is because advancing the opening timing of the intake valve can improve the scavenging, so that the above-described "late burning" can become properly active.

In FIG. 9, EVO is an abbreviation of Exhaust Valve Open, which means the opening timing of the exhaust valve, and EVC is an abbreviation of Exhaust Valve Close, which means the closing timing of the exhaust valve. Further, IVO is an abbreviation of Intake Valve Open, which means the opening timing of the intake valve, and IVC is an abbreviation of Intake Valve Close, which means the closing timing of the intake valve.

Herein, three experiments were conducted to inspect relationships between the valve-timing change and the torque change as shown in FIG. 10. One of them was advancing the intake-valve opening timing IVO prior to retarding the exhaust-valve closing timing EVC to increase the valve overlap period (characteristic b in FIG. 10). Another was both advancing the intake-valve opening timing IVO and retarding the exhaust-valve closing timing EVC at the same time to increase the valve overlap period (characteristic d in FIG. 10). The other was retarding the exhaust-valve closing timing EVC prior to advancing the intake-valve opening timing IVO to increase the valve overlap period (characteristic e in FIG. 10). Consequently, it was verified that a torque down shown by an arrow c occurs in the characteristic b. Herein, FIG. 10 is a characteristic chart with a lateral axis of crank angle (equivalent to the valve overlap period) and a vertical axis of torque.

The torque down shown by the arrow c may be caused by the followings. That is, as the scavenging-gas amount is increased by advancing the opening timing of the intake to increase the valve overlap period, the amount of air flowing into the exhaust port from the intake port increases and thereby the exhaust gas is cooled. Cooling the exhaust gas lowers the exhaust energy, so that the energy for rotating the turbine of the turbo charger decreases and thereby the torque down occurs. Thus, the torque down shown by the arrow c occurs despite increasing the valve overlap period in order to increase the engine torque. Accordingly, the smooth torque curve may not be obtained, so that the driver may feel uncomfortable feelings and thereby the drivability may deteriorate.

Meanwhile, Japanese Patent Laid-Open Publication No. 2007-40275 discloses a control of increasing the valve overlap period by retarding the closing timing of the exhaust valve at a rate which is greater than that of advancing the opening timing of the intake valve. Further, Japanese Patent Laid-Open Publication No. 2007-263083 discloses another control of increasing the valve overlap period by advancing the opening timing of the intake valve at a rate which is greater than that of retarding the closing timing of the exhaust valve. However, these controls were not enough to improve the drivability by obtaining the proper torque and the smooth torque curve in a wide driving area.

SUMMARY OF THE INVENTION

An object of the present invention is to provide a method of controlling an engine system or an engine system itself which can properly improve the drivability by obtaining the proper torque and the smooth torque curve in the wide driving area.

According to the present invention, there is a method of controlling an engine system having an internal combustion engine and a turbo charger which is equipped with a turbine arranged in an exhaust passage of the internal combustion engine and a compressor arranged in an intake passage of the internal combustion engine and driven by the turbine, comprising increasing a valve overlap period during which an intake valve and an exhaust valve of a combustion chamber of the internal combustion engine are both opened as a desired torque of the internal combustion engine increases by advancing an opening timing of the intake valve at a rate which is greater than that of retarding a closing timing of the exhaust valve in a low engine-torque area in which the desired torque of the internal combustion engine is relatively low, and increasing the valve overlap period as the desired torque of the internal combustion engine increases by retarding the closing timing of the exhaust valve at a rate which is greater than that of advancing the opening timing of the intake valve in a high engine-torque area in which the desired torque of the internal combustion engine is relatively high.

According to the present invention, in the low engine-torque area (the intake volume is small), the above-described increasing the valve overlap period by advancing the opening timing of the intake valve at the greater rate can increase the scavenging-gas amount. Thereby, the reaction of the fresh air and the unburned fuel in the exhaust pipe becomes active and thereby the temperature and the pressure of the exhaust gas flowing to the turbine of the turbo charger increases, so that the rotational speed of the turbine increases and accordingly the rotational speed of the compressor of the turbo charger also increases. Consequently, the intake volume can be increased effectively. Herein, the blowing over of the intake gas may be properly restrained to further increase the intake volume by advancing the closing timing of the intake valve in accordance with advancing the opening timing of the intake valve. Meanwhile, in the high engine-torque area (the intake volume is great), the above-described increasing the valve overlap period by retarding the closing timing of the exhaust valve at the greater rate can restrain the scavenging-gas amount from increasing too much. Thereby, the too-much fresh air is prevented from mixing into the combustion gas, so that the temperature of the exhaust gas can be maintained properly without any over-cooling by the fresh air. Accordingly, the proper rotational speed of the turbine and thus the rotational speed of the compressor of the turbo charger can be ensured. As a result, the drivability can be improved by obtaining the proper torque and the smooth torque curve in the wide driving area.

Herein, the above-described low engine-torque area may be when the desired torque of the internal combustion engine is less than a threshold torque, and the above-described high engine-torque area may be when the desired torque of the internal combustion engine is greater than the threshold torque.

According to an embodiment of the present invention, the engine system further has an exhaust shutter valve arranged in the exhaust passage upstream of the turbine of the turbo charger, and the method further comprises closing the exhaust shutter valve in a low engine-speed area in which an engine speed is relatively low and opening the exhaust shutter valve in a high engine-speed area in which the engine speed is relatively high. Thereby, since the exhaust shutter valve is closed and thereby the speed of the exhaust gas flowing to the turbine is increased in the low engine-speed area in which the engine speed is relatively low, the proper turbo energy is ensured, so that the intake volume can be increased. Meanwhile, since the exhaust shutter valve is opened and thereby the above-described "late burning" is suppressed by decreasing the air blowing through in the high engine-speed area in which the engine speed is relatively high, the improper increase of the exhaust temperature can be restrained. In general, in case the scavenging-gas amount increases in accordance with the increase of the valve overlap period, the remaining gas containing the unburned fuel may burn lately in the exhaust pipe and thereby the temperature of the exhaust gas may increase so quickly up to an improperly high temperature. Thus, there is a possibility that the temperatures of the turbine, sensors and the like may exceed their resisting temperatures and thereby the control may become impossible. According to the above-described embodiment, however, the late burning and thus the increase of the exhaust gas temperature is suppressed by closing the exhaust shutter valve in the high engine-speed area as described above. Herein, if the late burning is completely stopped, the drive torque of the turbine may not be ensured. Therefore, the late burning is suppressed by opening the exhaust shutter valve without completely stopping it, so that the flowing speed of the exhaust gas flowing to the turbine is weakened and thereby the scavenging-gas mount is controlled.

Herein, the above-described low engine-speed area may be when the engine speed of the internal combustion engine is less than a threshold speed, and the above-described high engine-speed area may be when the engine speed of the internal combustion engine is less than the threshold speed.

According to another embodiment of the present invention, the above-described threshold torque is set to decrease as the engine speed increases. Thereby, the functions of increasing the intake volume and suppressing the blowing over of the intake gas can be effectively obtained in accordance with the amount of air.

According to another embodiment of the present invention, the threshold torque or the threshold speed is set to decrease as a temperature of exhaust gas of the internal combustion engine increases. Thereby, the functions of increasing the intake volume and suppressing the blowing over of the intake gas can be further effectively obtained by executing the control considering the temperature of the exhaust gas. Further, in the engine equipped with the exhaust shutter valve, the turbo energy can be ensured properly and thereby the intake volume can be increased when the exhaust-gas temperature is low, and the late burning can be suppressed and thereby the improper increase of the exhaust temperature can be suppressed effectively when the exhaust-gas temperature is high.

According to another embodiment of the present invention, the method further comprises making the closing timing of the intake valve farther from a bottom dead center of an intake stroke of the combustion chamber in the low engine-torque area, and increasing the valve overlap period after making the closing timing of the intake valve closer to the bottom dead center of the intake stroke when the desired torque of the internal combustion engine increases from the low engine-torque area. Thereby, since the closing timing of the intake valve is advanced before or retarded after the bottom dead center of the intake stroke of the combustion chamber in the low engine-torque area, the effective compression ratio of the engine can be made smaller than the expansion ratio. Accordingly, the thermal efficiency can be increased suppressing the engine knocking, and the fuel consumption (fuel economy) can be improved by decreasing the pumping loss.

According to another embodiment of the present invention, the method further comprises determining a possibility of abnormal combustion occurring in the combustion chamber, and increasing the rate of retarding the closing timing of the exhaust valve when it is determined that the possibility of abnormal combustion is greater than a threshold value and the desired torque of the internal combustion engine is less than the threshold torque. Thereby, the scavenging in the intake stroke can be improved. That is, the remaining gas in the cylinder is scavenged effectively and lots of fresh air having the lower temperature is introduced. Accordingly, the inside temperature of the cylinder can be lowered sufficiently. Thus, even in the engine equipped with the turbo charger which tends to produce abnormal combustions, such as pre-ignition, knocking, or the like, which may be caused by the excessive increase of the inside temperature of the cylinder, despite providing a superior acceleration, such abnormal combustions can be suppressed effectively.

According to another embodiment of the present invention, the method further comprises decreasing the rate of advancing the opening timing of the intake valve when it is determined that the possibility of abnormal combustion is greater than the threshold value and the desired torque of the internal combustion engine is less than the threshold torque. Thereby, since the scavenging in the intake stroke can be improved, the remaining gas in the cylinder can be scavenged effectively and lots of fresh air having the lower temperature can be introduced. Accordingly, the inside temperature of the cylinder can be lowered sufficiently. Thus, in the engine equipped with the turbo charger which tends to produce abnormal combustions, such as pre-ignition, knocking, or the like, which may be caused by the excessive increase of the inside temperature of the cylinder, despite providing the superior acceleration, such abnormal combustions can be suppressed further effectively by lowering the inside temperature of the cylinder properly.

According to another embodiment of the present invention, the method further comprises determining a possibility of abnormal combustion occurring in the combustion chamber, and decreasing the rate of retarding the closing timing of the exhaust valve and the rate of advancing the opening timing of the intake valve when it is determined that the possibility of abnormal combustion is greater than a threshold value and the desired torque of the internal combustion engine is greater than the threshold torque. Thereby, since the amount of fresh air flowing down into the exhaust gas decreases, and thereby the late burning becomes less active. Consequently, the rotational speed of the turbine decreases and the turbine speed decreases accordingly. Thus, since the intake volume is small enough, the abnormal combustion can be effectively suppressed.

According to another aspect of the present invention, there is an engine system comprising an internal combustion engine having a combustion chamber with an intake valve and an exhaust valve, a turbo charger equipped with a turbine arranged in an exhaust passage of the internal combustion engine and a compressor arranged in an intake passage of the internal combustion engine and driven by the turbine, and a controller controlling the intake valve and the exhaust valve so as to increase a valve overlap period during which the intake valve and the exhaust valve are both opened as a desired torque of the internal combustion engine increases by advancing an opening timing of the intake valve at a rate which is greater than that of retarding a closing timing of the exhaust valve in a low engine-torque area in which the desired torque of the internal combustion engine is relatively low, and so as to increase the valve overlap period as the desired torque of the internal combustion engine increases by retarding the closing timing of the exhaust valve at a rate which is greater than that of advancing the opening timing of the intake valve in a high engine-torque area in which the desired torque of the internal combustion engine is relatively high.

Further, according to an embodiment of the above-described engine system, the engine system further comprises an exhaust shutter valve arranged in the exhaust passage upstream of the turbine of the turbo charger, and the controller controls the exhaust shutter valve so as to be closed in a low engine-speed area in which an engine speed is relatively low and so as to be opened in a high engine-speed area in which the engine speed is relatively high.

The above-described engine system can provide substantially the same operations and advantages as those of the above-described method of controlling the engine system.

Other features, aspects, and advantages of the present invention will become apparent from the following description which refers to the accompanying drawings.

DETAILED DESCRIPTION OF THE INVENTION

Embodiment 1

Figure 1:
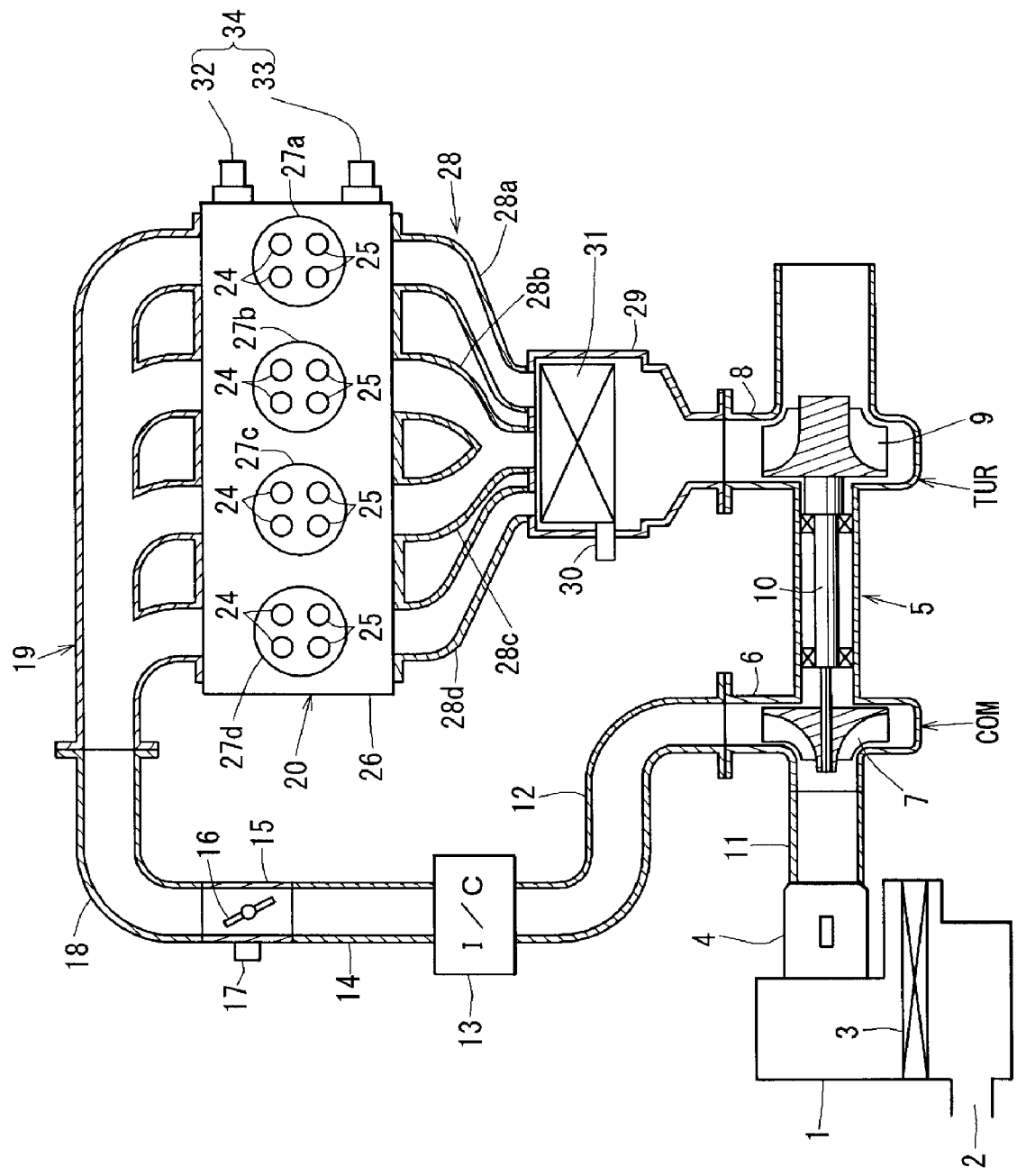
FIG. 1 is a schematic constitution diagram showing an engine system equipped with a turbo charger according to a first embodiment the present invention.

The drawings show an engine system equipped with a turbo charger and a method of controlling the engine system. First, the engine system will be described referring to FIG. 1. An intake system of the engine system comprises an air cleaner 1 which purifies intake air. The air cleaner 1 has an inlet 2 and an element 3. An airflow sensor 4 which detects the amount of the purified intake air from the air cleaner 1 with its voltage change is provided downstream of the element 3 of the air cleaner 1.

A turbo charger 5 is arranged between the intake system and an exhaust system of the engine system. The turbo charger 5 comprises a compressor impeller 7 which is arranged in a compressor housing 6 of the intake system and a turbine wheel 9 which is arranged in a turbine housing 8 of the exhaust system. The compressor impeller 7 and the turbine wheel 9 are interconnected by a rotational shaft 10. The turbine wheel 9 is rotated by the exhaust gas of the engine system and the compressor impeller 7 is driven by the turbine wheel 9. Thus, the turbo charger 5 can supply to the engine system the amount of air which is greater than the natural intake-air amount.

A first intake passage 11 connects a downstream portion of the airflow sensor 4 and an inlet of the compressor housing 6 of the compressor COM. A second intake passage 12 connects an outlet of the compressor housing 6 to an inlet of an intercooler 13, which decreases the temperature of the air pressurized by the compressor COM and increases the density of the air to improve the volumetric efficiency of the intake air.

A throttle body 15 is coupled to an outlet of the intercooler 13 via a third intake passage 14. The throttle body 15 comprises a throttle valve 16 in its chamber and a throttle sensor 17 which detects an opening of the throttle valve 16.

An intake manifold 19 is coupled to a downstream portion of the throttle body 15 via a fourth intake passage 18. A front end of the intake manifold 19 is divided into plural portions for respective cylinders of an engine 20. These divided portions of the intake manifold 19 connect to respective ports 21 of an engine head of the engine 20 as shown in FIG. 2.

Figure 2:
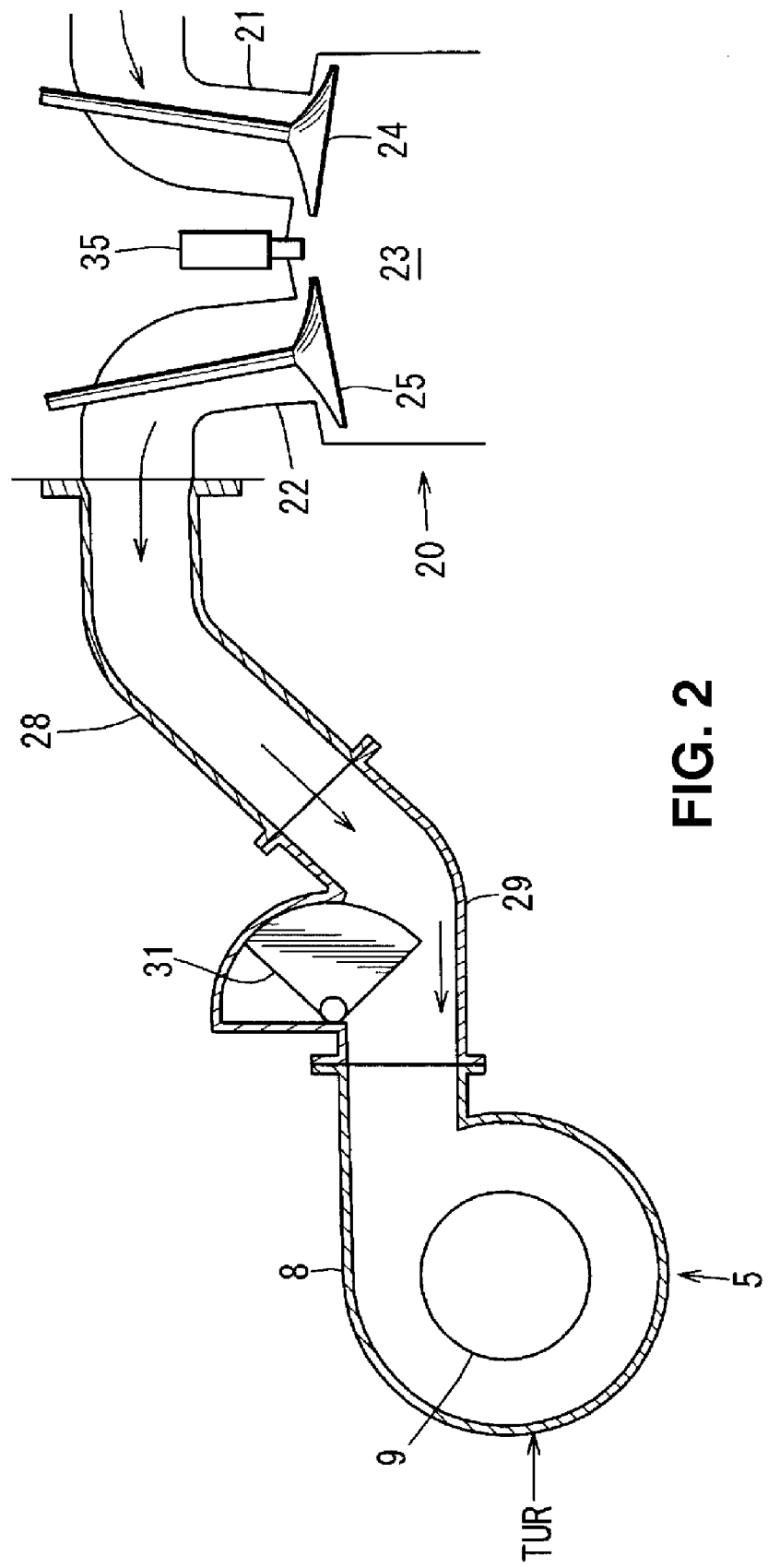
FIG. 2 is a partial sectional view showing an exhaust part of the engine system shown in FIG. 1.

As shown in FIG. 2, the engine 20 comprises the above-described intake ports 21, exhaust ports 22, a combustion chamber 23 which connects to the ports 21, 22, a piston (not illustrated), and so on. At the intake and exhaust ports 21, 22 are provided intake and exhaust valves 24, 25 respectively, which are driven by a valve drive mechanism, not illustrated.

The present embodiment exemplifies an inline four-cycle four-cylinder engine as the engine 20. A cylinder block 26 has first through fourth cylinders 27a-27d, and an exhaust manifold 28 which has first through fourth exhaust passages 28a-28d is attached to the cylinder block 26 as shown in FIG. 1.

Herein, an upstream portion of the exhaust manifold 28 is comprised of four independent exhaust passages (see exhaust passages 28*a*-28*d*), and two of the passages 28*b*, 28*c* collect into one passage downstream of these passages, so that a downstream portion of the exhaust manifold 28 is comprised of three passages.

A downstream portion of the exhaust manifold 28 is connected to an inlet of an exhaust-shutter vale housing 29, which stores an exhaust shutter valve 31 which is driven by an actuator 30. An outlet side of the housing 29 is connected to an inlet of the turbine housing 8 of a turbine TUR.

Thus, the exhaust shutter valve 31 is provided in the exhaust-shutter valve housing as the exhaust passage upstream of the turbine TUR of the turbo charger 5. This exhaust shutter valve 31 is formed in a fan shape, when viewed from the side, as shown in FIG. 2, and its position is adjustable between its closed position shown in FIG. 2 and its fully opened position shown in FIG. 3.

Figure 3:
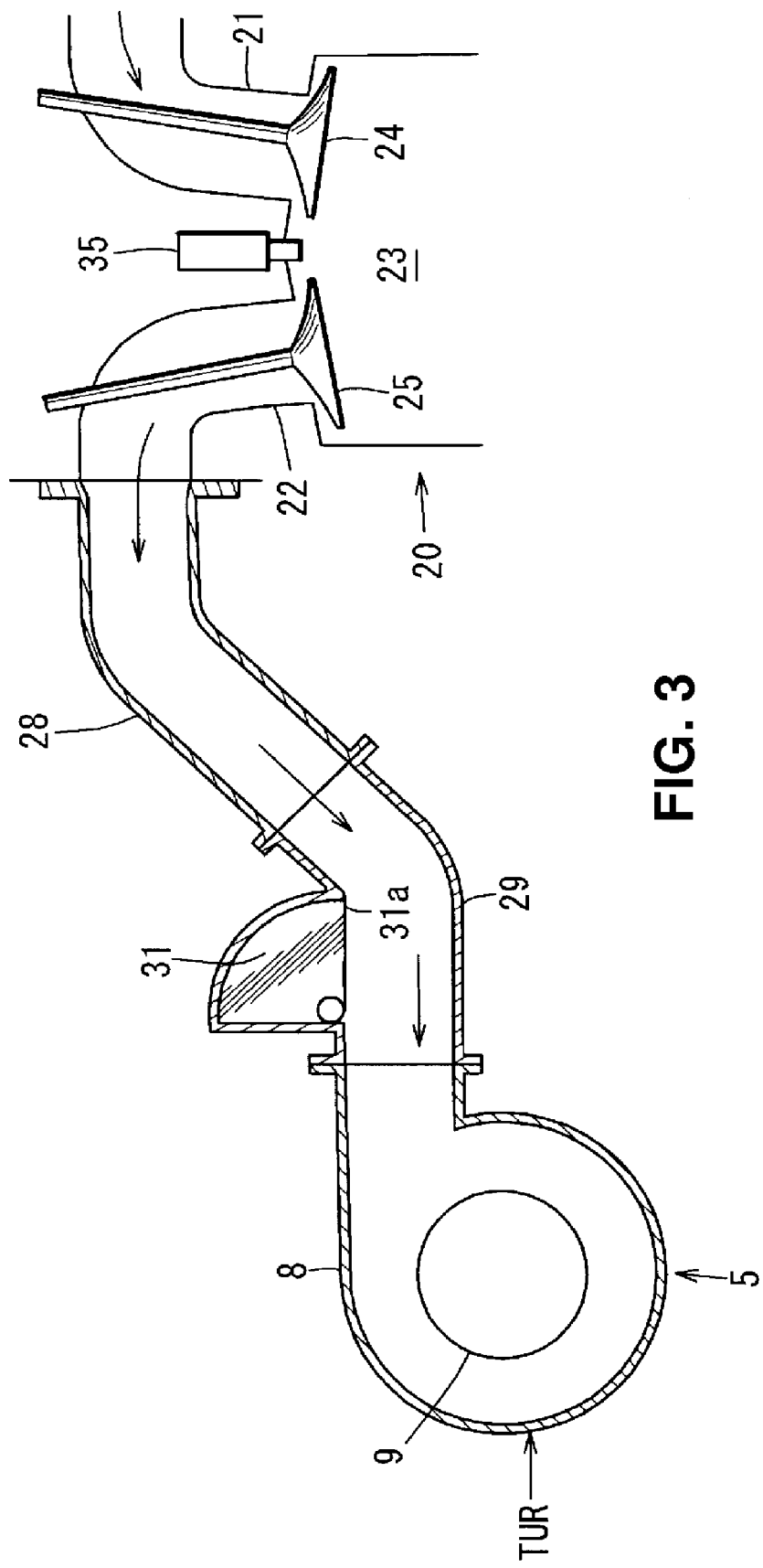
FIG. 3 is a sectional view showing a state in which an exhaust shutter valve is fully opened.

When the exhaust shutter valve 31 is closed as shown in FIG. 2, the flowing speed of the exhaust gas to the turbine TUR is increased and thereby the turbo energy is strengthened by the dynamic-pressure supercharging, so that the amount of air intake can be increased. Meanwhile, when the exhaust shutter valve 31 is opened as shown in FIG. 3, an upper wall of the exhaust passage and a lower face 31*a* of the exhaust shutter valve 31 become flush so that the lower face 31*a* does not provide any resistance with the exhaust-shutter vale housing 29 as the exhaust passage.

Further, as shown in FIG. 1, at the cylinder head of the engine 20 are provided an intake-valve timing changing device 32 and an intake-valve timing changing device 33 which change the valve overlap period during which the intake valve 24 and the exhaust valve 25 are both opened as a desired torque of the engine 20 increases. These intake-valve and exhaust-valve timing changing devices 32, 33 constitute a valve-timing changing device 34.

Figure 9:
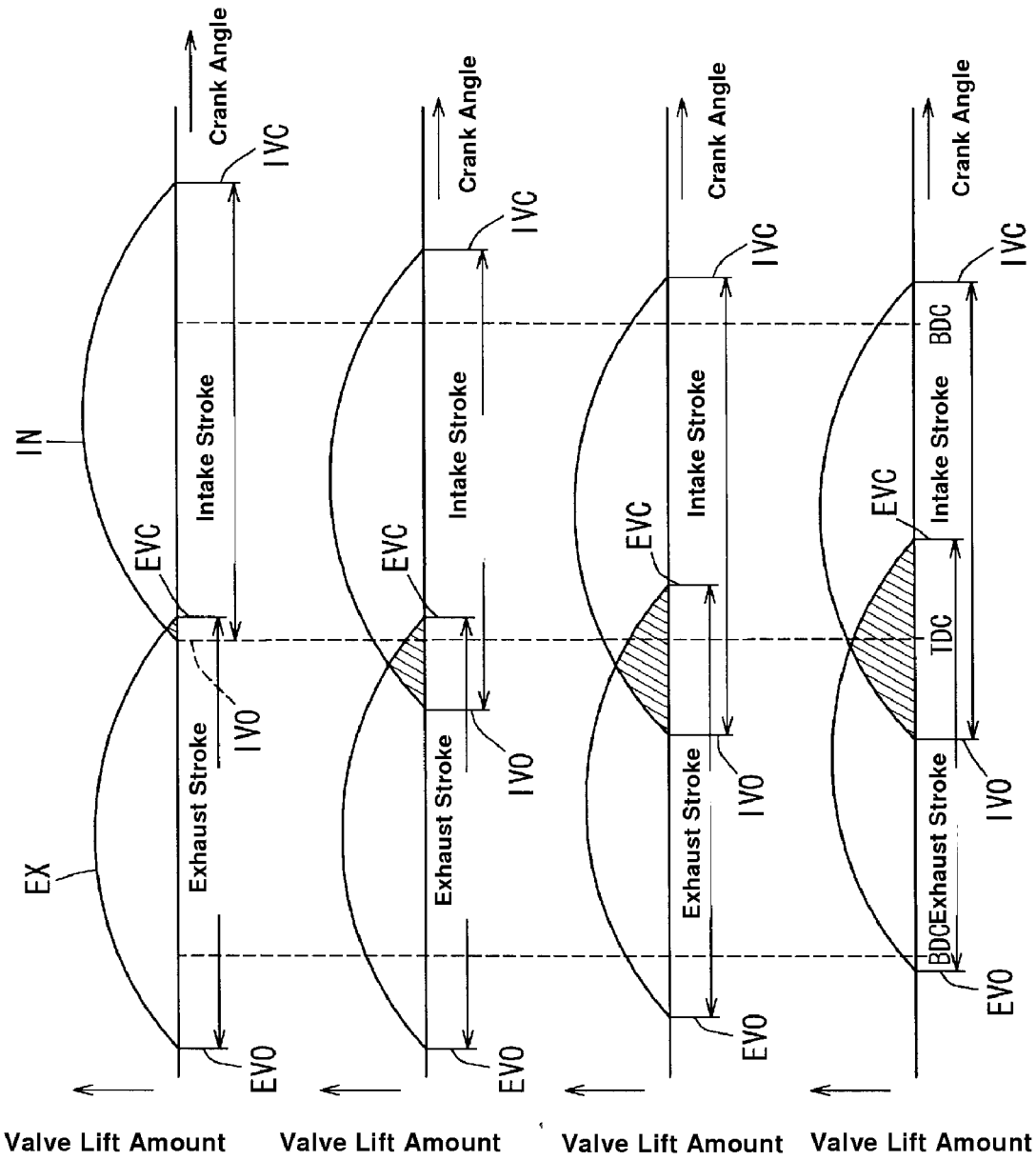
FIGS. 9A, 9B, 9C and 9D are characteristics showing changes of a valve overlap period in accordance with advancing an opening timing and retarding a closing timing of an exhaust valve in a state in which a lift amount of the intake valve is not changed.

Herein, the intake-valve timing changing device 32 is comprised of a phase type of valve timing changing mechanism VVT (Variable Valve Timing) which changes the intake-valve opening timing IVO and the intake-valve closing timing IVC, which are shown in FIG. 9, keeping the valve open period of the intake valve 24 constant. The exhaust-valve timing changing device 33 is comprised of the phase type of valve timing changing mechanism VVT (Variable Valve Timing) which changes the exhaust-valve opening timing EVO and the exhaust-valve closing timing EVC, which are shown in FIG. 9, keeping the valve open period of the exhaust valve 25 constant. Reference numeral 35 in FIGS. 2 and 3 denotes an ignition plug provided at the top of the combustion chamber 23 of the cylinder head.

Figure 4:
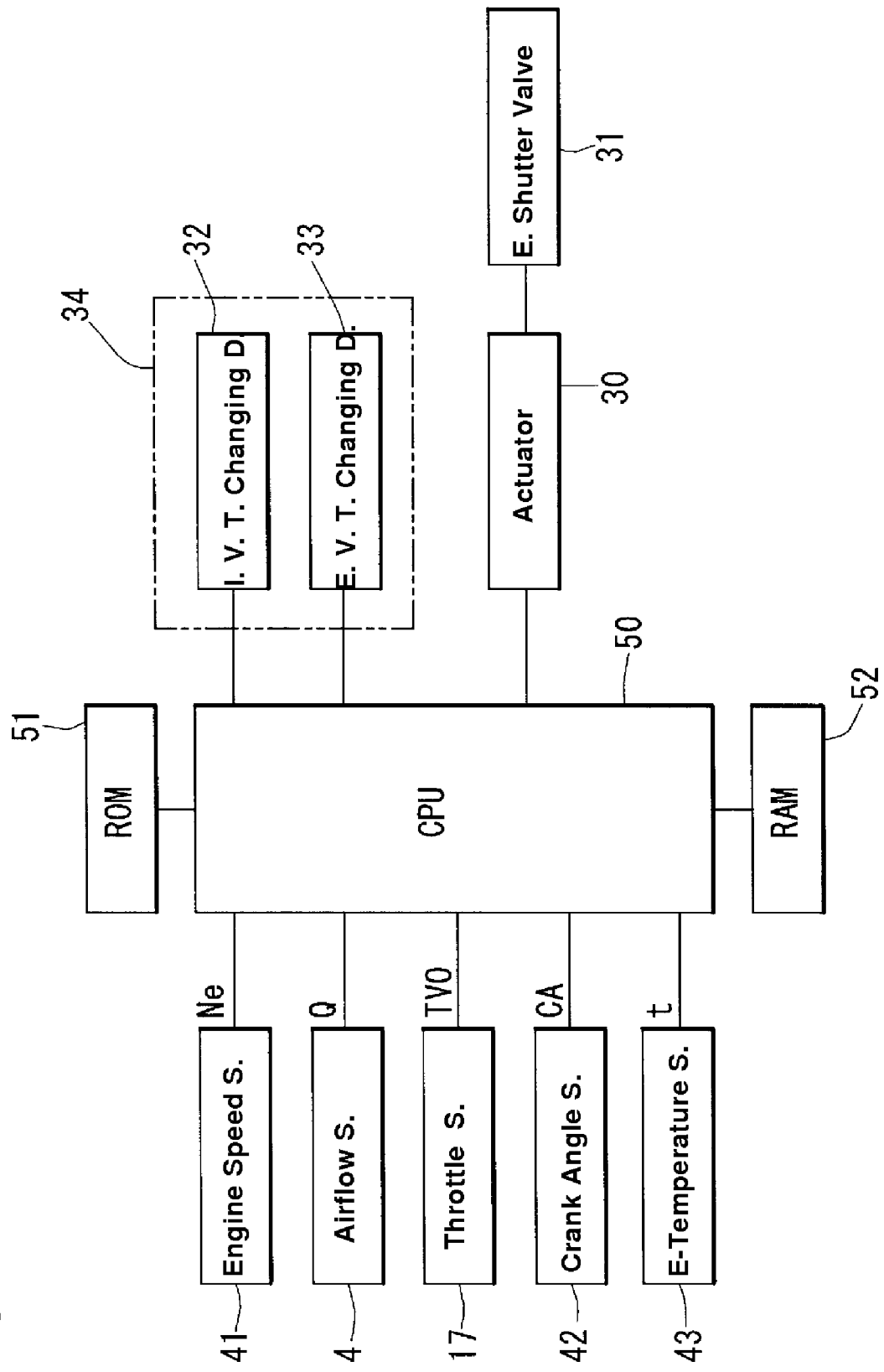
FIG. 4 is a block diagram of a control circuit.

FIG. 4 is a block diagram of a control circuit of the engine system equipped with the turbo charger. A CPU 50, as a controller, controls the intake-valve timing changing device 32, the intake-valve timing changing device 33, and the actuator 30 based on various input signals, such as an engine speed Ne detected by an engine speed sensor 41, the intake-air amount Q detected by the airflow sensor 4, the throttle opening TVO detected by the throttle sensor 17, a crank angle CA detected by a crank angle sensor 42, and an exhaust-gas temperature t detected by an exhaust-gas temperature sensor 43, in accordance with a control program stored in a ROM 51. The above-described actuator 30 controls the exhaust shutter valve 31 shown in FIGS. 2 and 3, and the RAM 52 stores a map M1 shown in FIG. 5, and so on.

The above-described CPU 50, ROM 51 and RAM 52 constitute an engine control unit (ECU), which may be considered as the controller of the engine system of the present invention. The above-described engine speed sensor 41 detects the engine speed Ne. This sensor 41 may be comprised of an ignition coil.

The throttle sensor 17 detects the opening TVO of the throttle valve 16, and the crank angle sensor 42 detects the crank angle CA. The exhaust-gas temperature sensor 43 is attached to a portion downstream of the turbine TUR of the turbo charger 5 and upstream of a catalyst (not illustrated) and detects the exhaust-gas temperature t inside the exhaust pipe.

Figure 5:
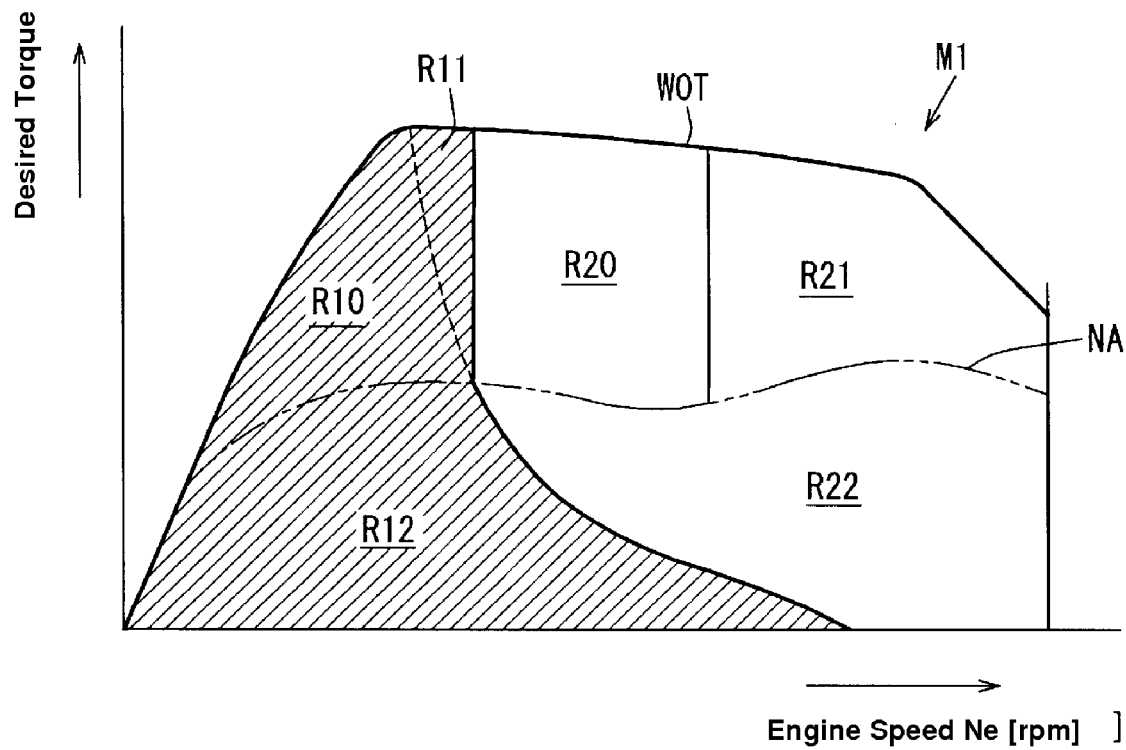
FIG. 5 is an explanatory chart of a map memorized in RAM.

The map M1 with a lateral axis of the engine speed Ne and a vertical axis of the desired torque in FIG. 5 includes low-speed supercharging areas R10, R11, a low-speed low-torque area R12, high-speed supercharging areas R20, R21, and a high-speed low-torque area R22, which may be partitioned from each other. According to the present embodiment, the exhaust shutter valve 31 is controlled so as to be closed in the areas R10, R11 and R12 with hutching and to be fully opened in the other areas R20, R21, R22.

Further, WOT in FIG. 5 denotes the maximum torque. Herein, the CPU 50 (controller) controls the intake valve 24 and the exhaust valve 25 so as to increase the valve overlap period OL during which the intake valve 24 and the exhaust valve 25 are both opened as the desired torque of the engine 20 increases by advancing the intake-valve opening timing IVO at a rate which is greater than that of retarding the exhaust-valve closing timing EVC in the low engine-torque area in which the desired torque of the engine is relatively low, and so as to increase the valve overlap period OL as the desired torque of the engine increases by retarding the exhaust-valve closing timing EVC at a rate which is greater than that of advancing the intake-valve opening timing IVO in the high engine-torque area in which the desired torque of the engine is relatively high.

Figure 6:
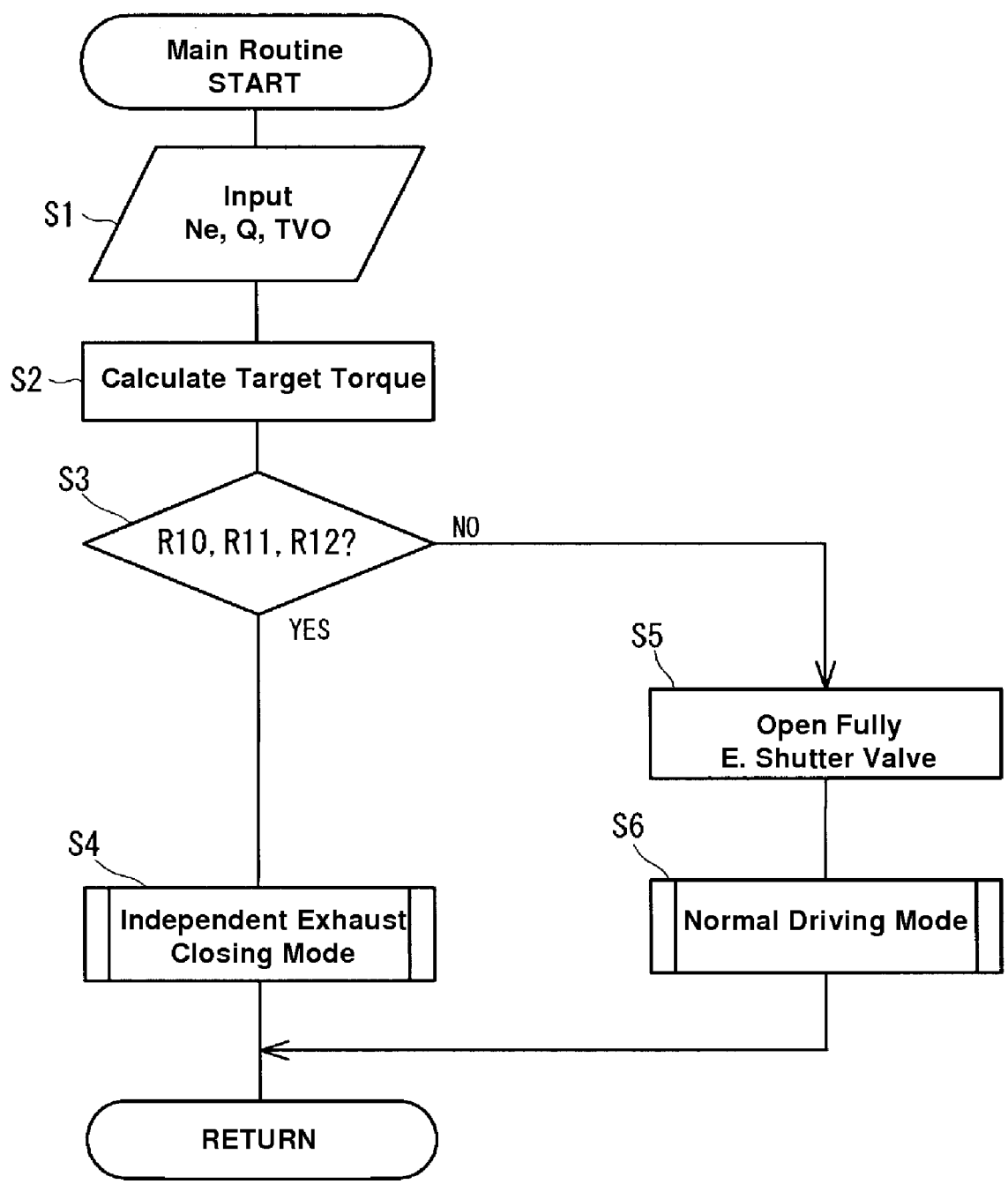
FIG. 6 is a flowchart of a main routine of a control method of the engine system equipped with the turbo charger.
Figure 7:
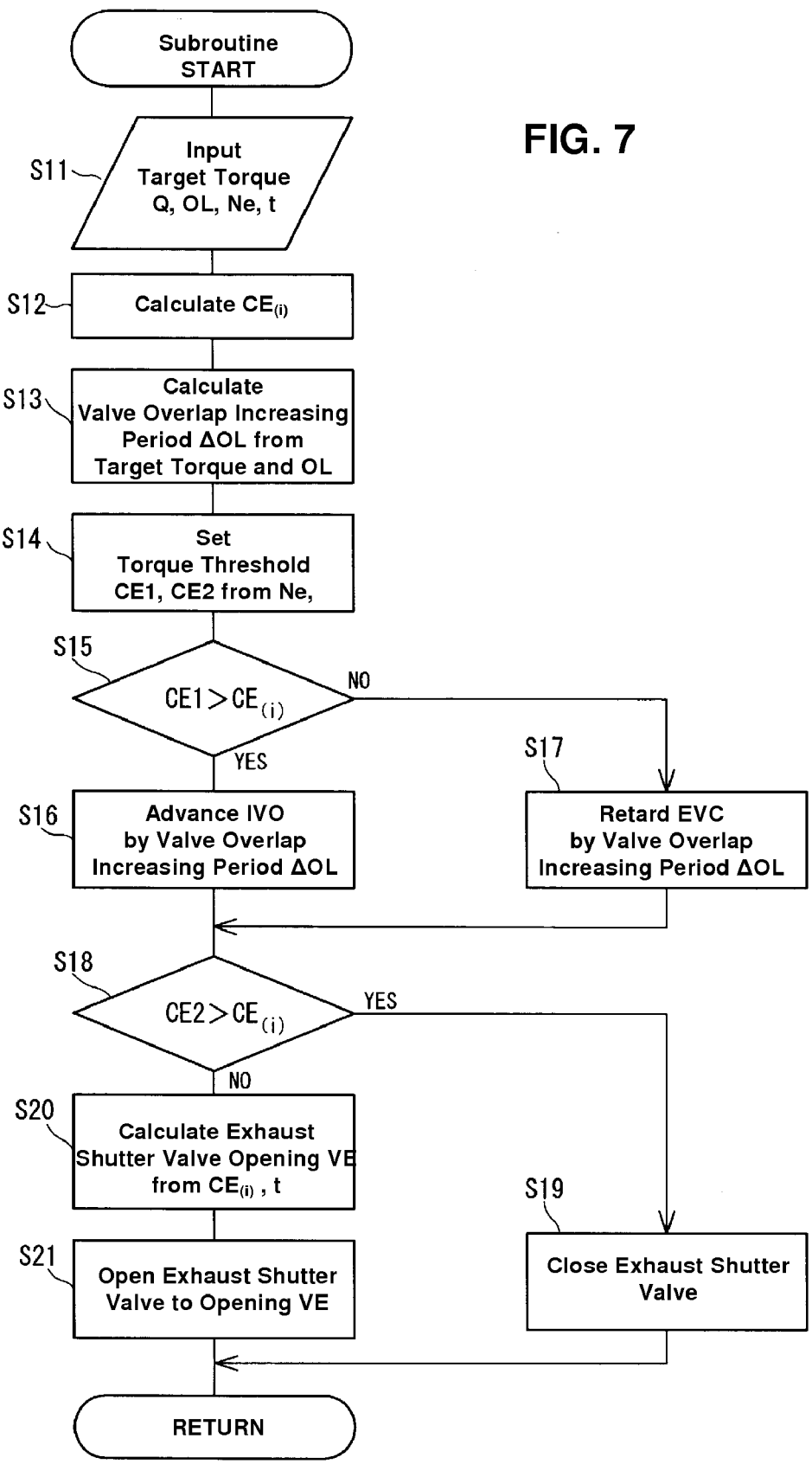
FIG. 7 is a flowchart of a subroutine of the control method of the engine system equipped with the turbo charger.

Hereinafter, the method of controlling the engine system equipped with the turbo charger will be described referring to flowcharts of FIGS. 6 and 7. In step S1 of the main routine of FIG. 6, the CPU 50 inputs the detections of the engine speed Ne from the engine speed sensor 41, the intake-air amount Q from the airflow sensor 4, the throttle opening TVO from the throttle sensor 17, and so on, and calculates an intake-air volumetric efficiency CE (corresponding to the desired torque of the engine (i.e., the engine load)) based on the engine speed Ne and the intake-air amount Q.

In the next step S2, the CPU 50 calculates a target torque (corresponding to the desired torque of the map M1 of FIG. 5) of the engine 20 based on the above-described inputted detections. In the next step S3, the CPU 50 determines the current driving state of the engine. Herein, when it is determined that the current driving state is in the hutching area of the low-speed supercharging areas R10, R11 and the low-speed low-torque area R12 shown in FIG. 5 (YES in the step S3), the control sequence proceeds to step S4. While, when it is determined that the current driving state is the other area of the high-speed supercharging areas R20, R21 and the high-speed low-torque area R22 (NO in the step S3), the control sequence proceeds to step S5.

The CPU 50 executes an independent exhaust closing mode in the step S4, which will be described later referring to a subroutine of FIG. 7. Meanwhile, the CPU 50 operates to fully open the exhaust shutter valve 31 via the actuator 30 as shown in FIG. 3 in the step S5. In the next step S6, the CPU 50 executes a normal driving mode, and then the control sequence returns. Herein, while the normal driving mode of the step S6 will not be described in detail, this control is similar to processing which are shown in FIG. 7 except steps S15-S21.

Next, the control of the step S4 will be described specifically referring to the subroutine of FIG. 7. In step S11 of FIG. 7, the CPU 50 inputs the target torque calculated in the step S2 of FIG. 6 and a target value of the valve overlap period OL which is set according to the target torque, and the detections of the intake-air amount Q, the engine speed Ne, the exhaust-gas temperature t and so on.

In the next step S12, the CPU 50 obtains the current intake-air volumetric efficiency $CE_{(i)}$ based on the engine speed Ne and the intake-air amount Q, and sets this intake-air volumetric efficiency as the engine torque. Then, in step S13, the CPU 50 calculates a valve overlap increasing period (AOL) based on the above-described calculated target torque and the target value of the valve overlap period OL. Then, the CPU 50 in step S14 sets thresholds CE1, CE2 of the engine torque from the inputted engine speed Ne and exhaust-gas temperature t.

Herein, the threshold CE1 is a threshold to determine whether the current engine driving state is in a low engine-torque area or in a high-torque area (i.e., an upper limit of the low engine-torque area or a lower limit of the high engine-torque area). The threshold CE2 is a threshold to switch the exhaust shutter valve 31 between a control for the closed position and a control for the opened (partially or fully) position. The values of these thresholds CE1, CE2 are respectively set to become smaller as the engine speed Ne or the exhaust-gas temperature t increases.

In the next step S15, the threshold CE1 is compared with the current intake-air volumetric efficiency $CE_{(i)}$ (engine torque). When it is determined that $CE1 > CE_{(i)}$ thus the current engine driving state is in the low engine-torque area (YES), the control sequence proceeds to step S16. When it is determined that $CE1 < CE_{(i)}$ thus the current engine driving state is in the high engine-torque area (NO), the control sequence proceeds to another step S17.

In the step S16, the CPU 50 advances the intake-valve opening timing IVO by the valve overlap increasing period (ΔOL) calculated in the step S13 in accordance with the current driving state being in the low engine-torque area.

In the step S17, the CPU 50 retards the exhaust-valve closing timing EVC by the valve overlap increasing period (ΔOL) calculated in the step S13 in accordance with the current driving state being in the high engine-torque area.

That is, according to the processing of the above-described steps S11-S17, when the current engine driving state is in the low engine-torque area, $CE1 > CE_{(i)}$, the valve overlap period OL is increased as the desired torque of the engine increases by advancing the intake-valve opening timing IVO at the rate greater than that of retarding the exhaust-valve closing timing EVC. Meanwhile, when the current engine driving state is in the high engine-torque area, $CE1 < CE_{(i)}$, the valve overlap period OL is increased as the desired torque of the engine increases by retarding the exhaust-valve closing timing EVC at the rate greater than that of advancing the intake-valve opening timing IVO.

Figure 10:
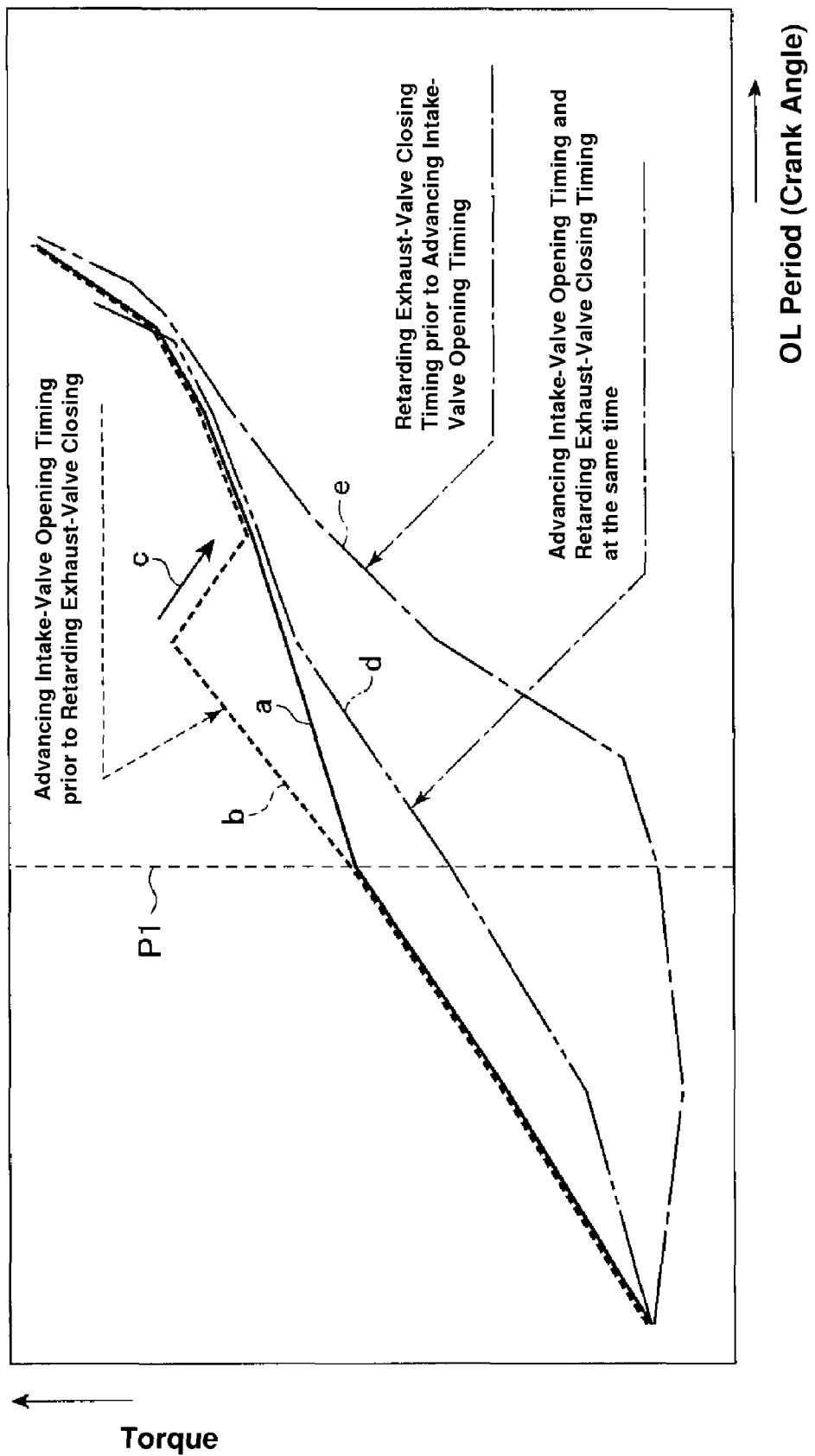
FIG. 10 is a characteristic showing torque changes in accordance with the crank angle (valve overlap period).

Thus, in the control of the intake valve 24 and the exhaust vale 25 in which the valve overlap period OL is increased as the desired torque of the engine increases, advancing the intake-valve opening timing IVO is given priority to in the low engine-torque area before reaching a switching point P1 shown in FIG. 10. In the high engine-torque area after the switching point P1, however, retarding the exhaust-valve closing timing EVC is given priority to. Thereby, the smooth torque curve without any improper torque down, which is shown by the characteristic a in FIG. 10, can be obtained.

In the next step S18, the threshold CE2 is compared with the current intake-air volumetric efficiency $CE_{(i)}$ (engine torque). When it is determined that $CE2 > CE_{(i)}$ thus the current engine driving state is in the low engine-torque area (YES) (herein, CE2>CE1), the control sequence proceeds to step S19. When it is determined that $CE2 < CE_{(i)}$ thus the current engine driving state is in the high engine-torque area (NO), the control sequence proceeds to another step S20.

Herein, as an alternative determination in place of the above-described processing of the step S18, the flowing processing may be applied. That is, a threshold THRne of the engine speed Ne is set, and this threshold THRne is compared with the current engine speed $Ne_{(i)}$. When the current driving state is in the low engine-speed area, $THRne > Ne_{(i)}$, the control sequence proceeds to the step S19. When the current driving state is in the high engine-speed area, $THRne < Ne_{(i)}$, the control sequence proceeds to the step S20.

In the step S19, the CPU 50 closes the exhaust shutter valve 31 as shown in FIG. 2 in accordance with the current driving state being in the low engine-torque area (or in the low engine-speed area), so that the speed of the exhaust gas to the turbine TUR of the turbo charger 5 is increased. Thereby, the turbo drive energy is strengthened by the increased dynamic-pressure supercharging, and the amount of the intake air is increased.

Meanwhile, the CPU 50 in the step S20 calculates the current intake-air volumetric efficiency $CE_{(i)}$ (engine torque) and the opening VE of the exhaust shutter valve 31 from the exhaust-gas temperature in accordance with the current driving state being in the high engine-torque area (or in the high engine-torque area).

Figure 8:
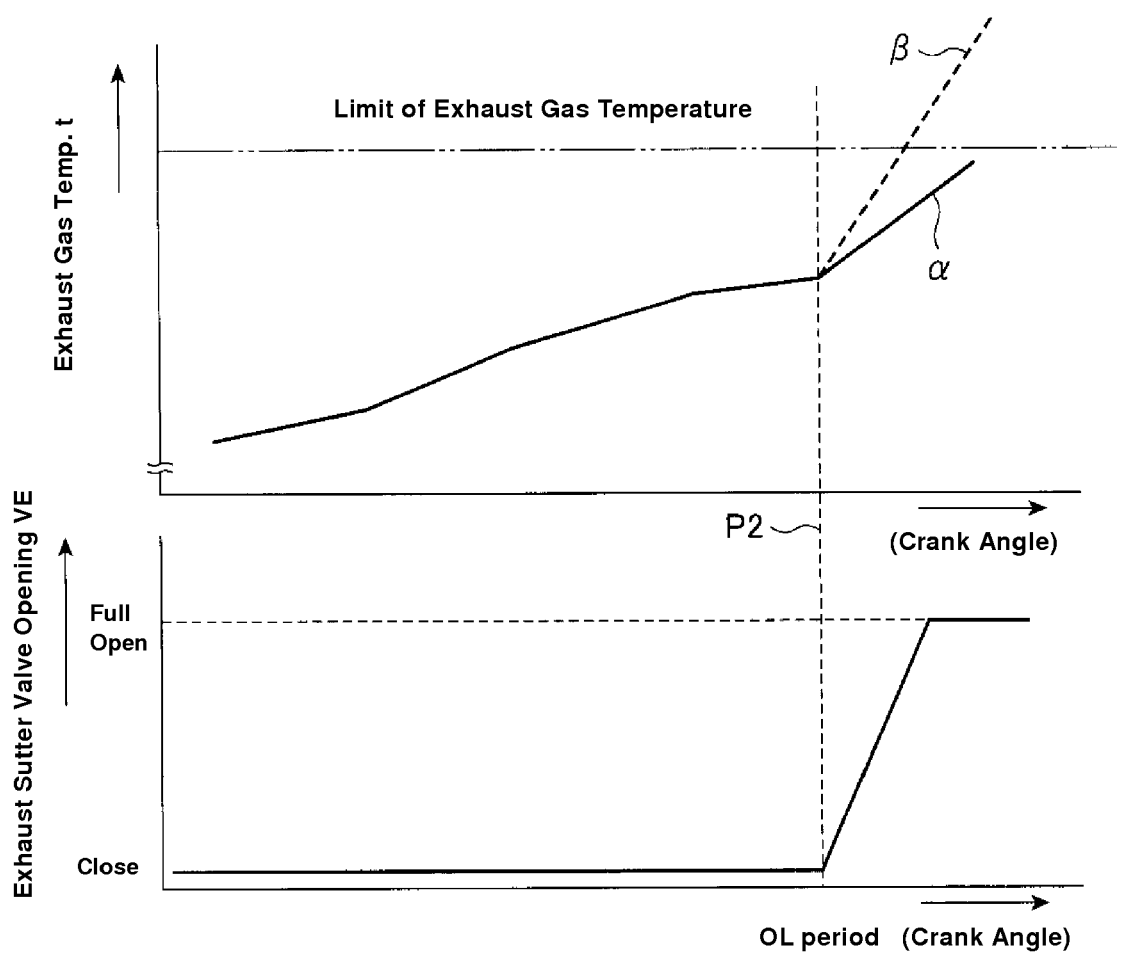
FIG. 8 is control characteristics showing changes of temperature of exhaust gas and an opening of the exhaust shutter valve in accordance with a crank angle.

In the next step S21, the CPU 50 controls the actuator 30 so that the exhaust shutter valve 31 opens to the opening VE calculated in the step S20. Thereby, while the exhaust shutter valve 31 is closed until a switching point P2 as shown in FIG. 8, it is opened to the specified opening VE (including the full open) after the switching point P2. Accordingly, the dynamic-pressure supercharging decreases, and thereby the amount of the air blowing through deceases, so that the late burning of the unburned remaining gas can be suppressed. In case this control is not executed, the exhaust-gas temperature may increase quickly as shown by the characteristic β of FIG. 8. According to the above-described control, however, the quick increase of the exhaust-gas temperature can be suppressed as shown by the characteristic a of FIG. 8.

As described above, the method of controlling the engine system equipped with the turbo charger according to the present embodiment comprises increasing the valve overlap period OL as the desired torque of the engine 20 increases by advancing the intake-valve opening timing IVO at the rate greater than that of retarding the exhaust-valve closing timing EVC in the low engine-torque area (see the step S16), and increasing the valve overlap period OL as the desired torque of the engine increases by retarding the exhaust-valve closing timing EVC at the rate greater than that of advancing the intake-valve opening timing IVO in the high engine-torque area (see the step S17).

According to the present method, in the low engine-torque area (the intake volume is small), the above-described increasing the valve overlap period OL by advancing the intake-valve opening timing IVO at the greater rate can increase the scavenging-gas amount. Thereby, the reaction of the fresh air and the unburned fuel in the exhaust pipe becomes active and thereby the temperature and the pressure of the exhaust gas flowing to the turbine TUR of the turbo charger 5 increases, so that the rotational speed of the turbine TUR increases and accordingly the rotational speed of the compressor COM of the turbo charger 5 also increases. Consequently, the intake volume can be increased effectively. Herein, the blowing over of the intake gas may be properly restrained to further increase the intake volume by advancing the intake-valve closing timing IVC in accordance with advancing the intake-valve opening timing IVO. Meanwhile, in the high engine-torque area (the intake volume is great), the above-described increasing the valve overlap period OL by retarding the exhaust-valve closing timing EVC at the greater rate can restrain the scavenging-gas amount from being increased too much. Thereby, the too-much fresh air is prevented from mixing into the combustion gas, so that the temperature of the exhaust gas can be maintained properly without any over-cooling by the fresh air. Accordingly, the proper rotational speed of the turbine TUR and thus the rotational speed of the compressor COM of the turbo charger 5 can be ensured. As a result, the drivability can be improved by obtaining the proper torque and the smooth torque curve (see the characteristic a in FIG. 10) in the wide driving area.

Further, according to the present embodiment, the engine system further has the exhaust shutter valve 31 which is arranged in the exhaust passage (see the exhaust-shutter-valve housing 29) upstream of the turbine TUR of the turbo charger 5, and the exhaust shutter valve 31 is closed in the low engine-speed area in which the engine speed Ne is relatively low (see the steps S4, S19) and the exhaust shutter valve 31 is opened in the high engine-speed area in which the engine speed Ne is relatively high (see the steps S5, S21).

Thereby, since the exhaust shutter valve 31 is closed and thereby the speed of the exhaust gas flowing to the turbine TUR is increased in the low engine-speed area in which the engine speed Ne is relatively low, the proper turbo energy is ensured by the high dynamic pressure, so that the intake volume can be increased. Meanwhile, since the exhaust shutter valve 31 is opened and thereby the "late burning" is suppressed by decreasing the air blowing through with the low dynamic pressure in the high engine-speed area in which the engine speed Ne is relatively high, the improper increase of the exhaust temperature can be restrained.

In general, in case the scavenging-gas amount increases in accordance with the increase of the valve overlap period OL, the remaining gas containing the unburned fuel may burn lately in the exhaust pipe and thereby the temperature of the exhaust gas may increase so quickly up to an improperly high temperature (see the characteristic β in FIG. 8). Thus, there is a possibility that the temperatures of the turbine TUR and sensors (such as, the exhaust-gas temperature 43 or an air-fuel ration sensor, not illustrated) may exceed their resisting temperatures and thereby the control may become impossible.

According to the above-described embodiment, however, the late burning and thus the increase of the exhaust gas temperature is suppressed by closing the exhaust shutter valve 31 in the high engine-speed area as described above (see the characteristic β in FIG. 8). Herein, if the late burning is completely stopped, the drive torque of the turbine TUR may not be ensured. Therefore, the late burning is suppressed by opening the exhaust shutter valve 31 without completely stopping it, so that the flowing speed of the exhaust gas flowing to the turbine TUR is weakened and thereby the scavenging-gas mount is controlled.

The threshold CE1 which is the threshold to determine whether the current engine driving state is in the low engine-torque area or in the high-torque area (i.e., the upper limit of the low engine-torque area or the lower limit of the high engine-torque area) is set to decrease as the engine speed Ne increases. Thereby, the functions of increasing the intake volume and suppressing the blowing over of the intake gas can be effectively obtained.

Further, the above-described threshold torque CE1 or the threshold THRne of the engine speed Ne to determine whether the current engine driving state is in the low engine-torque area or in the high-torque area may be set to decrease as the temperature t of exhaust gas increases.

Thereby, the functions of increasing the intake volume and suppressing the blowing over of the intake gas can be further effectively obtained by executing the control considering the temperature of the exhaust gas. Further, in the engine equipped with the exhaust shutter valve 31, the turbo energy can be ensured properly and thereby the intake volume can be increased when the exhaust-gas temperature t is low, and the late burning can be suppressed and thereby the improper increase of the exhaust temperature can be suppressed effectively when the exhaust-gas temperature t is high.

According to the present engine system, the controller (see the CPU 50) controls the intake valve 24 and the exhaust valve 25 so as to increase the valve overlap period OL as the desired torque of the engine 20 increases by advancing the intake-valve opening timing IVO at the rate greater than that of retarding the exhaust-valve closing timing EVC in the low engine-torque area in which the desired torque of the engine is relatively low (see the step S16), and so as to increase the valve overlap period OL as the desired torque of the engine 20 increases by retarding the exhaust-valve closing timing EVC at the rate greater than that of advancing the intake-valve opening timing IVO in the high engine-torque area in which the desired torque of the engine is relatively high (see the step S17).

The present engine system can provide substantially the same operations and advantages of those described above for the method. That is, in the low engine-torque area (the intake volume is small), the above-described increasing the valve overlap period OL by advancing the intake-valve opening timing IVO at the greater rate can increase the scavenging-gas amount. Thereby, the reaction of the fresh air and the unburned fuel in the exhaust pipe becomes active and thereby the temperature and the pressure of the exhaust gas flowing to the turbine TUR of the turbo charger 5 increases, so that the rotational speed of the turbine TUR increases and accordingly the rotational speed of the compressor COM of the turbo charger 5 also increases. Consequently, the intake volume can be increased effectively. Herein, the blowing over of the intake gas may be properly restrained to further increase the intake volume by advancing the intake-valve closing timing IVC in accordance with advancing the intake-valve opening timing IVO. Meanwhile, in the high engine-torque area (the intake volume is great), the above-described increasing the valve overlap period OL by retarding the exhaust-valve closing timing EVC at the greater rate can restrain the scavenging-gas amount from being increased too much. Thereby, the too-much fresh air is prevented from mixing into the combustion gas, so that the temperature of the exhaust gas can be maintained properly without any over-cooling by the fresh air. Accordingly, the proper rotational speed of the turbine TUR and thus the rotational speed of the compressor COM of the turbo charger 5 can be ensured. As a result, the drivability can be improved by obtaining the proper torque and the smooth torque curve (see the characteristic a in FIG. 10) in the wide driving area.

The present invention should not be limited to the above-described embodiment.

For example, while the above-described embodiment exemplifies the engine with two intake valves and two exhaust valves, the present invention is applicable to an engine with two intake valves and a single exhaust valve. Further, the present invention should not be limited to the four-cylinder type of engine.

The above-described embodiment shows the example in which the intake-valve closing timing IVC is set to be retarded after the bottom dead center BDC of the intake stroke in the low engine-torque area by using the phase type of valve timing changing mechanism VVT (Variable Valve Timing) which changes the intake-valve opening timing IVO and the intake-valve closing timing IVC, which are shown in FIG. 9, keeping the valve open period of the intake valve 24 and the exhaust valve 25 constant. However, the intake-valve closing timing IVC may be set to be advanced before the bottom dead center BDC by using a CVVL system which will be described below.

In case the intake-valve closing timing IVC is set to be advanced before the bottom dead center BDC of the intake stroke or retarded after the bottom dead center BDC, as shown in FIG. 9, in the low engine-torque area, the effective compression ratio of the engine can be smaller compared with the expansion ratio. Accordingly, the thermal efficiency can be increased suppressing the engine knocking, and the fuel consumption (fuel economy) can be improved by decreasing the pumping loss.

Further, the effective compression ratio of the engine may be set to be smaller compared with the expansion ratio by making the intake-valve closing timing IVC farther from the bottom dead center BDC of the intake stroke at the normal driving state in the low engine-torque area. Meanwhile, at the initial stage of an acceleration driving state in the low engine-torque area (i.e., when the desired torque of the engine increases from the low engine-torque area), the intake-valve opening timing IVO may be advanced so as to increase the valve overlap period OL of the valves 24, 25 and the intake-valve closing timing IVC may be made closer to the bottom dead center BDC of the intake stroke accordingly.

According to the above-described control, the pumping loss can be deceased in the low engine-torque area. Meanwhile, at the initial stage of acceleration when the desired torque increases from the lower engine-torque area, the valve overlap period OL is increased by advancing the intake-valve opening timing, so that the scavenging can be improved and thereby the volumetric efficiency of the intake air can be effectively increased. Further, by making the intake-valve closing timing IVC closer to the bottom dead center of the intake stroke, the effective compression ratio is increased and thereby the volumetric efficiency of the intake air can be effectively increased, and also the drive energy of the turbo charger 5 increases and thereby the superior acceleration can be obtained.

Embodiment 2

Figure 11A:
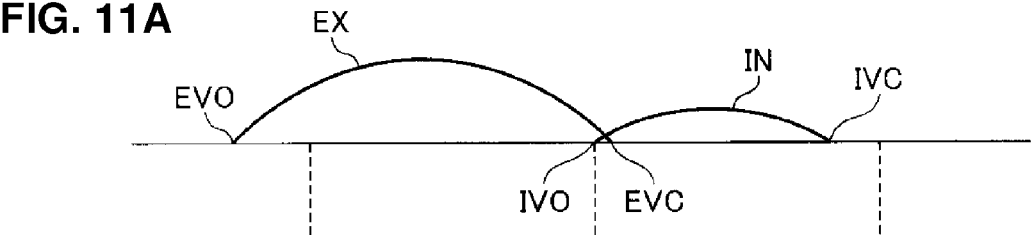
FIGS. 11A, 11B and 11C are characteristics according to a second embodiment in which the valve overlap period is changeable by changing the lift amount of the intake valve.
Figure 11B:
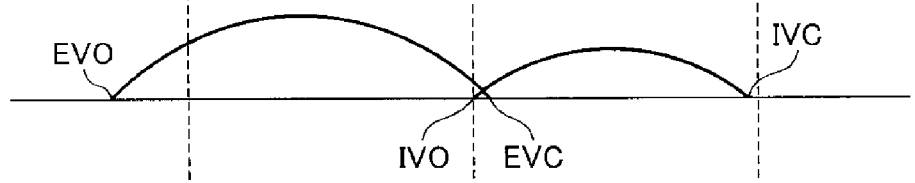
Figure 11C:
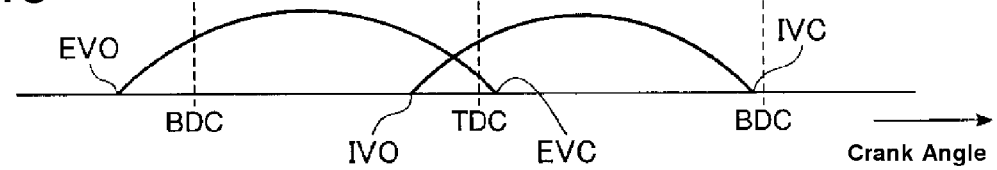

A second embodiment using the CVVL (Continuously Variable Valve Lift) system which can change the amount of lift of the intake valve 24, for example, with using a motor regardless of the rotation of a crankshaft along with the valve opening/closing timing of the intake valve 24 will be described. The intake-valve closing timing IVC is set to be advanced by a specified angle from the bottom dead center BDC of the intake stroke as shown in FIG. 11A. Herein, as the desired torque of the engine increases in accordance with the engine acceleration, the lift amount IN of the intake vale 25 is increased as shown in FIG. 11B so that the intake-valve closing timing IVC is retarded so as to be closer to the bottom dead center BDC of the intake stroke. After that, as shown in FIG. 11C, the intake-valve opening timing IVO is advanced so that the valve overlap period is increased.

Accordingly, since the intake-valve closing timing IVC can be made closer to the bottom dead center BDC of the intake stroke by increasing the lift amount of the intake valve 25 with the above-described valve lift changing mechanism at the initial state of the engine acceleration, the air blowing over of the intake air (gas) can be suppressed or the effective compression ratio can be increased. Thereby, the intake volumetric efficiency is increased effectively, so that the engine output torque can be increased effectively in accordance with the desired torque of the engine. Further, since the intake-valve opening timing IVO is advanced so that the valve overlap period OL is increased, the intake volumetric efficiency can be further increased so that the sufficient engine output torque can be obtained in accordance with the desired torque of the engine.

Embodiment 3

A third embodiment using the phase type of valve timing changing mechanism VVT which changes the opening/closing timing of the intake valve 24 and the exhaust valve 25, keeping the valve open period of these valves 24, 25 constant will be described. Herein, a possibility of abnormal combustion, such as knocking, occurring in the combustion chamber is determined (corresponding to a step S34, which will be described below) at the engine acceleration and the control is executed based on the detection result.

Figure 12:
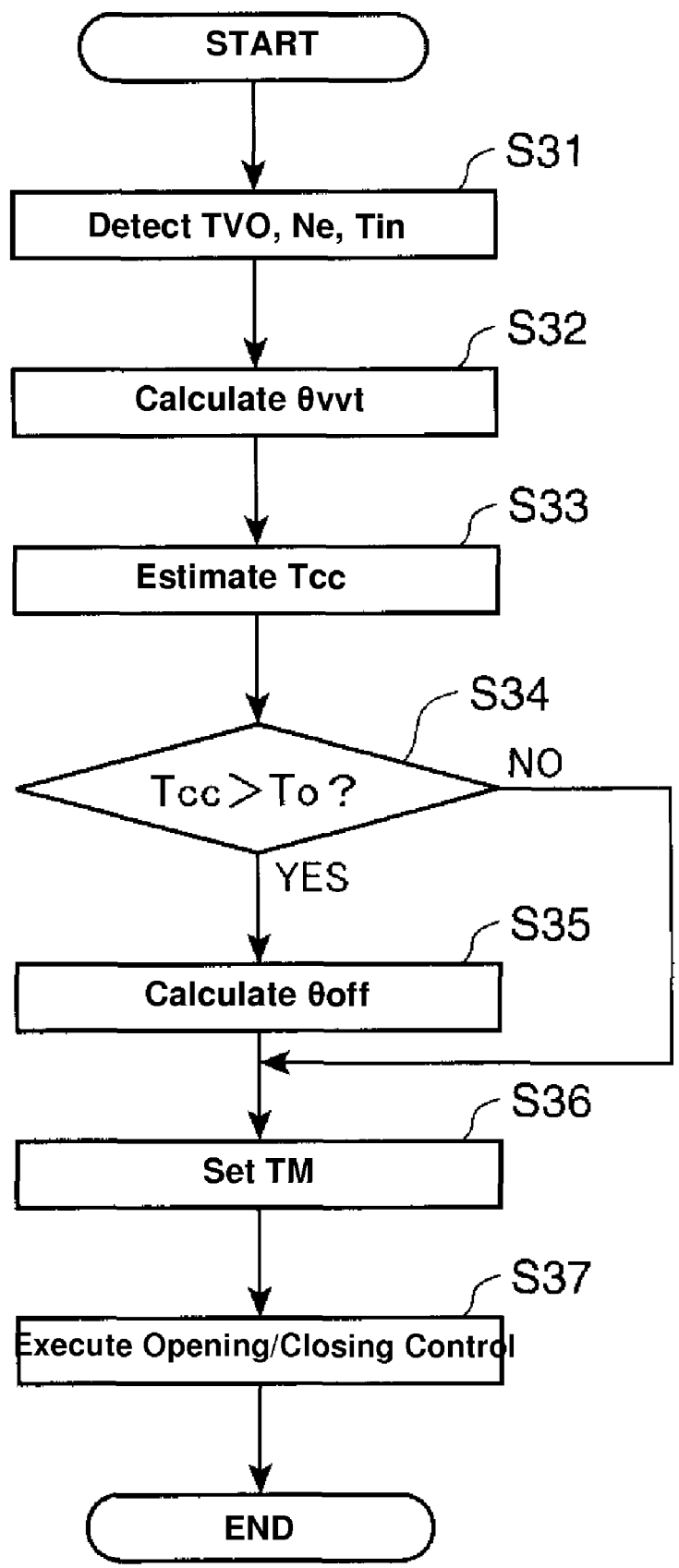
FIG. 12 is a flowchart of the control method of the engine system equipped with the turbo charger according to a third embodiment.

As shown in FIG. 12, the engine driving conditions, such as the throttle opening TVO, the engine speed Ne, and an intake-air temperature Tin, are detected (step S31). Then, a basic phase angle θvvt of the intake valve 24 and the exhaust valve 25 which corresponds to the desired engine torque is calculated based on the above-described detection results (step S32), and a cylinder-inside temperature Tcc is estimated (step S33). Next, the possibility of abnormal combustion, such as knocking, occurring in the combustion chamber is determined by detecting whether the above-described estimated cylinder-inside temperature Tcc is greater than a predetermined standard temperature To (step S34). Herein, the combustion state of the engine may be easily influenced by the octane rating of fuel and the like, so the above-described determination of the possibility of abnormal combustion is preferably conducted by considering these.

When it is determined that the possibility of abnormal combustion is not greater than a threshold value, that is, NO in the detection of the step S34, the opening/closing timing TM of the intake valve 24 and the exhaust valve 25 is set based on the basic phase angle θvvt calculated in the step S32 (step S36). The opening/closing control of the intake valve 24 and the exhaust valve 25 is executed based on this opening/closing timing TM (step S37).

Meanwhile, when it is determined that the possibility of abnormal combustion is greater than the threshold value, that is, YES in the detection of the step S34, a corrective value θoff to correct the intake-valve opening timing IVO and the exhaust-valve closing timing EVC in the same operation area, compared to the normal combustion state, is calculated based on the above-described estimated cylinder-inside temperature Tcc (step S35). The opening/closing timing TM of the intake valve 24 and the exhaust valve 25 is set based on the corrective value θoff and the basic phase angle θvvt calculated in the step S32 (step S36). Thus, the control of the exhaust-valve closing timing EVC is executed so that this timing EVC is retarded more (that is, the rate of retarding the exhaust-valve closing timing EVC is increased) compared with the normal combustion state (no possibility of abnormal combustion occurring is determined) (step S37).

Figure 13A:
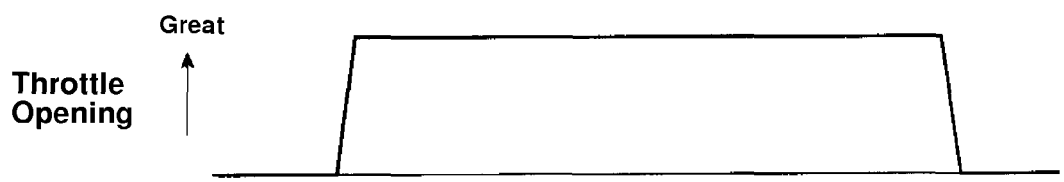
FIGS. 13A, 13B, 13C and 13D are time charts according to another embodiment in which abnormal combustion is suppressed by changing the amount of advancing the opening timing of the intake valve and the amount of retarding the closing timing of the exhaust valve.
Figure 13B:
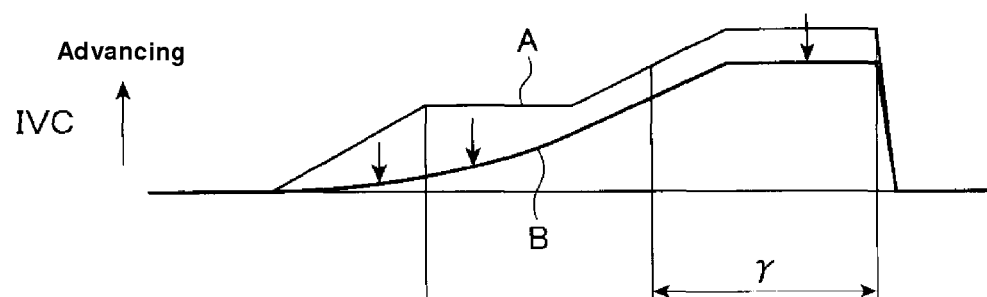
Figure 13C:
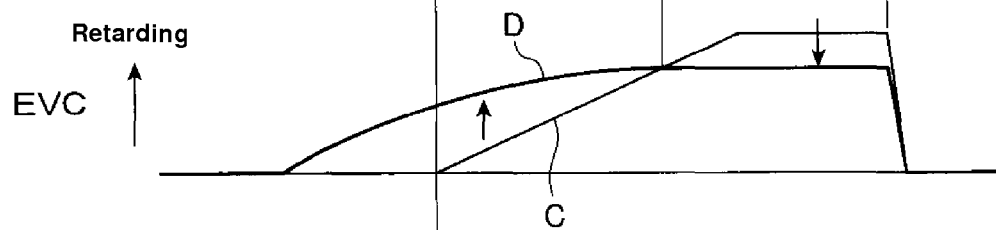
Figure 13D:
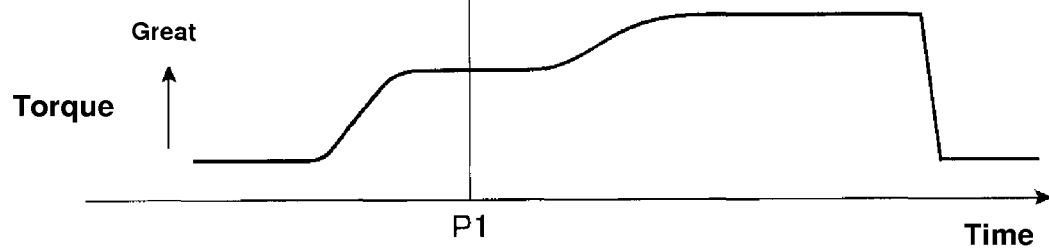

For example, when it is detected that the throttle opening TVO is in the engine acceleration state as shown in FIG. 13A and the engine combustion state is the normal state, the intake-valve opening timing IVO is increased to increase the valve overlap period OL from the initial stage of the acceleration (in the low engine-torque area) as shown by a line A in FIG. 13A, and then at the switching point P1 when the engine torque is greater than a specified value, the value of retarding the exhaust-valve closing timing EVC is increased so as to increase the valve overlap period OL as shown by a line C in FIG. 13C. Herein, if it is determined that the possibility of abnormal combustion is greater than the threshold value in the low engine-torque area when the acceleration state is detected, the value of advancing the intake-valve opening timing IVO is decreased as shown by a line B in FIG. 13B, compared with the line A of the normal combustion state (it is determined that the possibility of abnormal combustion is not greater than the threshold value), and also the value (rate) of retarding the exhaust-valve closing timing EVC is increased as shown by a line D in FIG. 13C, compared with the line C of the normal combustion state.

According to the above-described control in which the possibility of abnormal combustion is determined (see the step S34) when the engine state is in the low engine-torque area and the intake-valve opening timing is advanced, and the value (rate) of retarding the exhaust-valve closing timing EVC is increased, compared with the normal engine state (it is determined that the possibility of abnormal combustion is not greater than the threshold), in case it is determined that the possibility of abnormal combustion is greater than the threshold value, the scavenging in the exhaust stroke of the combustion chamber can be improved and thereby lots of cool and fresh air can be introduced by effectively exhausting the remaining gas from the inside of the cylinder, so that the inside temperature of the cylinder can be properly decreased. Accordingly, the abnormal combustion can be suppressed effectively even for the engine equipped with the turbo charger 5, in which the superior acceleration is obtained by the supercharging, but the inside temperature of the cylinder tends to be higher and thereby the pre-ignition, knocking or the like tend to be caused easily.

Herein, according to the present embodiment, the value (rate) of advancing the intake-valve opening timing IVO is decreased and the value (rate) of retarding the exhaust-valve closing timing EVC is increased, compared with the normal engine state, in case it is determined that the possibility of abnormal combustion is greater than the threshold value when the engine state is in the low engine-torque area. Thereby, the occurrence of the abnormal combustion can be prevented by suppressing the improper increase of the inside temperature of the cylinder with properly retarding the exhaust-valve closing timing EVC. Further, excessively increasing the valve overlap period OL can be prevented by decreasing the value of advancing the intake-valve opening timing IVO.

Especially, in case the above-described control is executed in the engine equipped with the phase type of valve timing changing mechanism VVT, the value of advancing the intake-valve opening timing IVO is decreased and also the value of retarding the exhaust-valve closing timing EVC is increased when it is determined that the possibility of abnormal combustion is greater than the threshold value, so that the effective compression ratio decreases so that the abnormal combustion such as knocking can be effectively suppressed.

Further, as shown in FIGS. 13B and 13C, the possibility of abnormal combustion is determined in the high engine-torque area y when the acceleration state is detected, and in case it is determined that the possibility of abnormal combustion is greater than the threshold value, the value (rate) of retarding the exhaust-valve closing timing EVC and the value (rate) of advancing the intake-valve opening timing IVO are decreased, respectively, compared with the normal engine state (it is determined that the possibility of abnormal combustion is not greater than the threshold), so that the valve overlap period OL is decreased.

Thereby, since the increase of the volumetric efficiency of the intake air can be suppressed by decreasing the valve overlap period with the decreased value of retarding the exhaust-valve closing timing EVC and the decreased value of advancing the intake-valve opening timing IVO in the high engine-torque area y where the abnormal combustion caused by the increase of the cylinder-inside temperature tends to occur often, the occurrence of the abnormal combustion can be effectively suppressed.

The present invention should not be limited to the above-described embodiments, and any other modifications and improvements may be applied within the scope of a sprit of the present invention.

What is claimed is:

1. A method of controlling an engine system having an internal combustion engine and a turbo charger which is equipped with a turbine arranged in an exhaust passage of the internal combustion engine and a compressor arranged in an intake passage of the internal combustion engine and driven by the turbine, comprising:
    increasing a valve overlap period during which an intake valve and an exhaust valve of a combustion chamber of the internal combustion engine are both opened as a desired torque of the internal combustion engine increases by advancing an opening timing of the intake valve at a rate which is greater than that of retarding a closing timing of the exhaust valve in a low engine-torque area in which the desired torque of the internal combustion engine is relatively low; and
    increasing the valve overlap period as the desired torque of the internal combustion engine increases by retarding the closing timing of the exhaust valve at a rate which is greater than that of advancing the opening timing of the intake valve in a high engine-torque area in which the desired torque of the internal combustion engine is relatively high.

2. The method of controlling an engine system as described in claim 1, wherein said low engine-torque area is when the desired torque of the internal combustion engine is less than a threshold torque, and said high engine-torque area is when the desired torque of the internal combustion engine is greater than the threshold torque.

3. The method of controlling an engine system as described in claim 2, wherein said engine system further having an exhaust shutter valve arranged in the exhaust passage upstream of the turbine of the turbo charger, and said method further comprises closing the exhaust shutter valve in a low engine-speed area in which an engine speed is relatively low and opening the exhaust shutter valve in a high engine-speed area in which the engine speed is relatively high.

4. The method of controlling an engine system as described in claim 3, wherein said low engine-speed area is when the engine speed of the internal combustion engine is less than a threshold speed, and said high engine-speed area is when the engine speed of the internal combustion engine is less than the threshold speed.

5. The method of controlling an engine system as described in claim 4, wherein said threshold torque is set to decrease as the engine speed increases.

6. The method of controlling an engine system as described in claim 5, wherein said threshold torque or said threshold speed is set to decrease as a temperature of exhaust gas of the internal combustion engine increases.

7. The method of controlling an engine system as described in claim 2, wherein said threshold torque is set to decrease as the engine speed increases.

8. The method of controlling an engine system as described in claim 7, wherein said threshold torque or said threshold speed is set to decrease as a temperature of exhaust gas of the internal combustion engine increases.

9. The method of controlling an engine system as described in claim 1, further comprising:
making the closing timing of the intake valve farther from a bottom dead center of an intake stroke of the combustion chamber in said low engine-torque area; and
increasing the valve overlap period after making the closing timing of the intake valve closer to the bottom dead center of the intake stroke when the desired torque of the internal combustion engine increases from the low engine-torque area.

10. The method of controlling an engine system as described in claim 7, further comprising:
determining a possibility of abnormal combustion occurring in the combustion chamber; and
increasing the rate of retarding the closing timing of the exhaust valve when it is determined that the possibility of abnormal combustion is greater than a threshold value and the desired torque of the internal combustion engine is less than said threshold torque.

11. The method of controlling an engine system as described in claim 10, further comprising:
decreasing the rate of advancing the opening timing of the intake valve when it is determined that the possibility of abnormal combustion is greater than said threshold value and the desired torque of the internal combustion engine is less than said threshold torque.

12. The method of controlling an engine system as described in claim 11, further comprising:
determining a possibility of abnormal combustion occurring in the combustion chamber; and
decreasing the rate of retarding the closing timing of the exhaust valve and the rate of advancing the opening timing of the intake valve when it is determined that the possibility of abnormal combustion is greater than a threshold value and the desired torque of the internal combustion engine is greater than said threshold torque.

13. The method of controlling an engine system as described in claim 1, further comprising:
determining a possibility of abnormal combustion occurring in the combustion chamber when the desired torque of the internal combustion engine increases in the low engine-torque area; and
increasing the rate of retarding the closing timing of the exhaust valve when it is determined that the possibility of abnormal combustion is relatively high.

14. The method of controlling an engine system as described in claim 13, further comprising:
decreasing the rate of advancing the opening timing of the intake valve when it is determined that the possibility of abnormal combustion is relatively high.

15. The method of controlling an engine system as described in claim 14, further comprising:
determining a possibility of abnormal combustion occurring in the combustion chamber when the desired torque of the internal combustion engine increases in the high engine-torque area; and
decreasing the rate of retarding the closing timing of the exhaust valve and the rate of advancing the opening timing of the intake valve when it is determined that the possibility of abnormal combustion in case of the desired torque increasing in the high engine-torque area is relatively high.

16. The method of controlling an engine system as described in claim 1, further comprising:
determining a possibility of abnormal combustion occurring in the combustion chamber when the desired torque of the internal combustion engine increases in the low engine-torque area; and
decreasing the rate of advancing the opening timing of the intake valve when it is determined that the possibility of abnormal combustion is relatively high.

17. The method of controlling an engine system as described in claim 16, further comprising:
determining a possibility of abnormal combustion occurring in the combustion chamber when the desired torque of the internal combustion engine increases in the high engine-torque area; and
decreasing the rate of retarding the closing timing of the exhaust valve and the rate of advancing the opening timing of the intake valve when it is determined that the possibility of abnormal combustion in case of the desired torque increasing in the high engine-torque area is relatively high.

18. The method of controlling an engine system as described in claim 1, further comprising:
determining a possibility of abnormal combustion occurring in the combustion chamber when the desired torque of the internal combustion engine increases in the high engine-torque area; and
decreasing the rate of retarding the closing timing of the exhaust valve and the rate of advancing the opening timing of the intake valve when it is determined that the possibility of abnormal combustion is relatively high.

19. An engine system comprising:
an internal combustion engine having a combustion chamber with an intake valve and an exhaust valve;
a turbo charger equipped with a turbine arranged in an exhaust passage of the internal combustion engine and a compressor arranged in an intake passage of the internal combustion engine and driven by the turbine; and
a controller controlling the intake valve and the exhaust valve so as to increase a valve overlap period during which the intake valve and the exhaust valve are both opened as a desired torque of the internal combustion engine increases by advancing an opening timing of the intake valve at a rate which is greater than that of retarding a closing timing of the exhaust valve in a low engine-torque area in which the desired torque of the internal combustion engine is relatively low, and so as to increase the valve overlap period as the desired torque of the internal combustion engine increases by retarding the closing timing of the exhaust valve at a rate which is greater than that of advancing the opening timing of the intake valve in a high engine-torque area in which the desired torque of the internal combustion engine is relatively high.

20. The engine system as described in claim 19, further comprising an exhaust shutter valve arranged in the exhaust passage upstream of the turbine of the turbo charger, and said controller controls the exhaust shutter valve so as to be closed in a low engine-speed area in which an engine speed is relatively low and so as to be opened in a high engine-speed area in which the engine speed is relatively high.

* * * * *